United States Patent
Kashitani

(10) Patent No.: US 11,417,886 B2
(45) Date of Patent: Aug. 16, 2022

(54) METHOD FOR PRODUCING SILICON OXIDE POWDER AND NEGATIVE ELECTRODE MATERIAL

(71) Applicant: OSAKA Titanium technologies Co., Ltd., Hyogo (JP)

(72) Inventor: Yusuke Kashitani, Amagasaki (JP)

(73) Assignee: OSAKA TITANIUM TECHNOLOGIES CO., LTD., Hyogo (JP)

( * ) Notice: Subject to any disclaimer, the term of this patent is extended or adjusted under 35 U.S.C. 154(b) by 138 days.

(21) Appl. No.: 17/041,587

(22) PCT Filed: Mar. 29, 2019

(86) PCT No.: PCT/JP2019/013969
§ 371 (c)(1),
(2) Date: Sep. 25, 2020

(87) PCT Pub. No.: WO2019/189747
PCT Pub. Date: Oct. 3, 2019

(65) Prior Publication Data
US 2021/0020942 A1 Jan. 21, 2021

(30) Foreign Application Priority Data
Mar. 30, 2018 (JP) .............................. JP2018-067311

(51) Int. Cl.
| | |
|---|---|
| H01M 4/04 | (2006.01) |
| H01M 4/58 | (2010.01) |
| C01B 33/32 | (2006.01) |
| H01M 4/62 | (2006.01) |
| H01M 10/0525 | (2010.01) |
| H01M 4/36 | (2006.01) |
| H01M 4/1391 | (2010.01) |
| H01M 4/485 | (2010.01) |
| H01M 4/02 | (2006.01) |

(52) U.S. Cl.
CPC ........... *H01M 4/5825* (2013.01); *C01B 33/32* (2013.01); *H01M 4/04* (2013.01); *H01M 4/0471* (2013.01); *H01M 4/1391* (2013.01); *H01M 4/366* (2013.01); *H01M 4/485* (2013.01); *H01M 4/625* (2013.01); *H01M 10/0525* (2013.01); *C01P 2002/72* (2013.01); *C01P 2004/80* (2013.01); *C01P 2006/40* (2013.01); *H01M 2004/027* (2013.01)

(58) Field of Classification Search
CPC .................................................. H01M 4/0471
See application file for complete search history.

(56) References Cited

U.S. PATENT DOCUMENTS

| | | | | |
|---|---|---|---|---|
| 2003/0053945 A1* | 3/2003 | Fukuoka | ............... | H01M 4/485 |
| | | | | 429/231.95 |
| 2011/0244333 A1* | 10/2011 | Kawada | .............. | H01M 4/0471 |
| | | | | 427/78 |
| 2018/0257942 A1* | 9/2018 | Takeshita | ................ | H01M 4/36 |

FOREIGN PATENT DOCUMENTS

| | | |
|---|---|---|
| JP | 3852579 B2 | 11/2006 |
| JP | 5411781 B2 | 2/2014 |
| WO | 2014/188654 A1 | 11/2014 |

OTHER PUBLICATIONS

International Search Report issued in PCT/JP2019/013969; dated Jul. 2, 2019.

* cited by examiner

*Primary Examiner* — Austin Murata
(74) *Attorney, Agent, or Firm* — Studebaker & Brackett PC

(57) ABSTRACT

To produce a silicon oxide-based negative electrode material containing Li and having uniform distribution of a Li concentration both inside particles and between particles although a C-coating film is formed on a surface, and yet in which generation of SiC is suppressed. A SiO gas and a Li gas are simultaneously generated by heating a Si-lithium silicate-containing raw material under reduced pressure. The Si-lithium silicate-containing raw material includes Si, Li, and O, in which a part of the Si is present as a Si simple substance and the Li is present as lithium silicate. By cooling the generated gases, Li-containing silicon oxide having an average composition of $SiLi_xO_y$ ($0.05<x<y$ and $0.5<y<1.5$ are satisfied) is prepared. After adjusting the particle size, a C-coating film having an average film thickness of 0.5 to 10 nm is formed on a surface of particles at a treatment temperature of 900° C. or less.

4 Claims, 3 Drawing Sheets

METHOD FOR PRODUCING SILICON OXIDE POWDER AND NEGATIVE ELECTRODE MATERIAL

TECHNICAL FIELD

The present invention relates to a method for producing a negative electrode material of a Li-ion secondary battery, in particular, a silicon oxide powder used as a negative electrode active material, and, in more detail, a C-coating Li-containing silicon oxide powder including Li inside particles and having carbon that covers a surface of particles, and relates to a negative electrode material using the silicon oxide powder.

BACKGROUND ART

Silicon oxide ($SiO_x$) is known to be a negative electrode material for a Li-ion secondary battery (negative electrode active material) having a large electric capacity and excellent lifetime properties. This silicon oxide-based negative electrode material is formed into a thin film negative electrode by mixing a silicon oxide powder, an electrically conductive auxiliary agent, and a binder to obtain a slurry, and applying the slurry onto a current collector made of a copper foil and the like. The silicon oxide powder given herein is obtained by, for example, heating a mixture of silicon dioxide and silicon to generate a silicon-monoxide gas as a deposit, followed by finely pulverizing the deposit. A silicon oxide powder produced by such a depositing method is known to improve the cycle durability because the silicon oxide powder includes many amorphous portions, and in which Li-ions uniformly diffuse during charge and discharge.

Problems characteristics of such a silicon oxide-based negative electrode material include low initial efficiency. This is a phenomenon in which a Li compound having an irreversible capacity that does not contribute to charge and discharge is generated at the time of initial charge, and thereby the initial discharge capacity is remarkably decreased. As a technique for eliminating this phenomenon, Li-doping in which Li is contained inside the particles of a silicon oxide powder is known. Furthermore, beside the Li-doping, a technique called C-coating of covering the surface of particles with carbon in order to impart electric conductivity to the silicon oxide powder is also known. A combination of the Li-doping and the C-coating is also performed.

As the method for producing a negative electrode material combining Li-doping and C-coating, Patent Literature 1 describes a method of mixing a SiO powder and a LiH powder to obtain a powder mixture, calcining the powder mixture at 750° C., and then performing C-coating at 750° C. By calcining the powder mixture, the SiO powder is doped with Li, and the Li-containing silicon oxide is subjected to the C-coating. However, this method is known to have the following two problems.

The first problem is that since the Li-doping is a solid phase reaction on a surface of particles, Li is introduced from the surface of particles into the inside of the particle, resulting in a nonuniform distribution of a Li concentration in the Li-containing silicon oxide powder, and in particular, the Li concentration on the surface of particles becomes high, or Li compounds are left on the surface of particles. When the distribution of a Li concentration becomes nonuniform in this way, Li on the surface of particles reacts with a solvent or adhesives at the time of preparing the electrode, thus making it difficult to prepare an electrode. In addition, charge and discharge properties are deteriorated.

The second problem is generation of SiC as indicated in Patent Literature 2 mentioned later. In other words, when a Li-containing silicon oxide powder after Li-doping is subjected to C-coating, C is reacted with Si particularly in the vicinity of the surface of the particles of the powder, thus accelerating generation of SiC. Since SiC unlike C does not have electric conductivity, the generation of SiC prevents desorption and insertion of electrons or Li, and may cause deterioration of the battery characteristics, particularly, the cycle durability and deterioration of discharge capacity, when the Li-containing silicon oxide powder is used for a negative electrode material.

For the purpose of solving the second problem, in Patent Literature 2, a silicon oxide powder is subjected to C-coating firstly, and then a silicon oxide powder after the C-coating is mixed with a powder of a Li compound and heated to perform Li-doping. By performing the C-coating before the Li-doping, generation of SiC is suppressed. However, the Li-doping is a solid phase reaction on a surface of particles, so that the distribution of a Li concentration in the Li-containing silicon oxide powder after the Li-doping becomes nonuniform. Thus, occurrence of the first problem is unavoidable.

As another method of the Li-doping, as shown in Patent Literature 3, a gas phase method including generating a SiO gas and a Li gas separately, then mixing both gases, followed by cooling and collecting thereof is also known. The gas phase method makes it possible to prepare a Li-containing silicon oxide powder in which lithium is not concentrated on a surface of particles. However, since uniform mixing of the SiO gas and the Li gas, control of temperature, and control of partial pressure are very difficult, a distribution of a Li concentration becomes nonuniform depending on depositing positions, and a difference occurs in the Li concentration between particles after a deposit is pulverized. When the distribution of a Li concentration between particles becomes nonuniform, in particles having a high Li concentration, a Si-rich phase, such as a LiSi alloy, having high reactivity is formed in particles, and this is reacted with a binder or a solvent at the time when the electrode is prepared. Therefore, similar to the case of the solid phase method, deterioration of battery performance is unavoidable.

CITATION LIST

Patent Literatures

[Patent Literature 1] International Publication WO2014-188654
[Patent Literature 2] Japanese Patent No. 5411781
[Patent Literature 3] Japanese Patent No. 3852579

SUMMARY OF INVENTION

Technical Problem

The present invention has been made in view of the above-mentioned problems, and has an object to provide a method for producing a silicon oxide powder, the method allowing Li to be contained, capable of making a distribution of a Li concentration uniform both inside particles and between particles although C-coating treatment is performed, and capable suppressing generation of SiC accompanying the C-coating treatment.

The present invention has another object to provide a negative electrode material containing Li inside particles of silicon oxide powder, and in which a distribution of concentration of Li is uniform both inside particles and between particles although a C-coating film is formed on a surface of particles, and yet generation of SiC is suppressed.

Solution to Problem

In order to achieve the above-mentioned object, the present inventor has thought that it is effective to eliminate two types of nonuniform distributions of a Li concentration in a silicon oxide powder, that is, a nonuniform distribution of a Li concentration inside particles and a nonuniform distribution of a Li concentration between particles, and to stabilize reactivity inside particles and between particles. Then, the present inventor has paid attention to a gas phase method as described in Patent Literature 3 as a method for producing a Li-containing silicon oxide powder, and have studied a method for generating a SiO gas and a Li gas simultaneously from the same raw material by the gas phase method.

As a simple method, it is conceivable that a SiO gas generating raw material and a Li gas generating raw material are simply mixed and heated. However, in this method, a SiO gas and a Li gas are not generated simultaneously. Only a Li gas having a higher vapor pressure is preferentially generated. Consequently, a material in which SiO and Li are uniformly mixed cannot be obtained.

As another method, it is conceivable that a composite compound of Li and Si, typically, lithium silicate such as $Li_2Si_2O_5$ is heated under reduced pressure to generate a SiO gas and a Li gas simultaneously. However, lithium silicate as a simple substance does not generate a gas by heating under reduced pressure. However, it is found that even in such lithium silicate, a SiO gas and a Li gas are simultaneously generated from the same raw material by heating under reduced pressure in the coexistence of Si, in particular, a Si simple substance, so that a gas in which SiO and Li are uniformly mixed can be obtained, and the obtained gas mixture is cooled and deposited to obtain a material in which SiO and Li are uniformly mixed as a whole deposit.

When the deposit in which SiO and Li are uniformly mixed is pulverized, in the Li-containing silicon oxide powder, both the nonuniform distribution of a Li concentration between particles and the nonuniform distribution of a Li concentration inside individual particles are to be eliminated. The reason why a SiO gas and a Li gas are generated simultaneously from lithium silicate in the coexistence of a Si simple substance is estimated to be because the lithium silicate is reduced by the Si simple substance.

As a result of further study, it is found that in the Li-containing silicon oxide powder having uniform distribution of a Li concentration in both inside particles and between particles, when C-coating is executed, generation of SiC on the interface beneath the C-coating film is suppressed although the C-coating is performed after the Li-doping. The reason therefor is thought to be because a Li concentration phenomenon on a surface of particles is eliminated in all particles, so that an activity degree of the surface of particles is reduced, and the reaction for forming SiC on the interface beneath the C-coating film is suppressed.

Then, in addition, it has been clear that when a film thickness and a treatment temperature in the C-coating treatment are restricted, the generation of SiC can be substantially inhibited on the interface beneath the C-coating film.

The present invention has been developed based on the above findings, and a method for producing a silicon oxide powder has a technical feature of heating a raw material including Si, Li, and O under reduced pressure to generate a SiO gas and a Li gas simultaneously; cooling the generated gases to prepare Li-containing silicon oxide having an average composition represented by $SiLi_xO_y$, wherein $0.05<x<y$ and $0.5<y<1.5$ are satisfied; and forming a C-coating film having an average film thickness of 0.5 to 10 nm on a surface of particles at a treatment temperature of 900° C. or less after adjusting a particle size.

Furthermore, a negative electrode material of the present invention has a technical feature of being a powder having an average composition represented by $SiLi_xO_y$, wherein $0.05<x<y$, $0.5<y<1.5$, and an average particle diameter of 1 µm or more are satisfied, wherein when particles of the powder are subjected to a cross-sectional TEM observation, ten particles each having a minor axis of 1 µm or more are extracted, and a Li concentration L1 in a position at a depth of 50 nm from an outermost surface and a Li concentration L2 in a position at a depth of 400 nm from the outermost surface are measured for each particle, L1/L2 satisfies $0.8<L1/L2<1.2$ and a coefficient of variation of L2 is 0.25 or less for all the particles; and further including a C-coating film having an average film thickness of 0.5 to 10 nm on a surface of particles, wherein a SiC peak is not present in XRD measurement.

In the method for producing a silicon oxide powder according to the present invention, as a first stage, a SiO gas and a Li gas are simultaneously generated from the same raw material while the simultaneously generated SiO gas and Li gas are cooled and collected on the same surface under the same conditions to obtain a deposit in which SiO and Li are mixed uniformly. When the deposit is pulverized into a powder, not only a nonuniform distribution of a Li concentration between particles but also a nonuniform distribution of a Li concentration inside individual particles is eliminated.

Specifically, the raw material containing Si, O, and Li is a Si.lithium silicate-containing raw material in which a portion of the Si is present as a Si simple substance, and the Li is present as lithium silicate. Use of this raw material allows simultaneous generation of a SiO gas and a Li gas from the lithium silicate by heating the lithium silicate in the coexistence of a Si simple substance. The same surface desirable for a cooling and depositing surface includes a partially circumferential surface in the circumferential direction of a cylindrical drum. The surface of the cylindrical drum is strictly a circumferential surface, but can be considered to be substantially planar if limited to a partial circumferential surface in the circumferential direction.

The Si-lithium silicate-containing raw material is typically a mixture of a Si simple substance and lithium silicate or a mixture of a Si simple substance, lithium silicate, and Si oxide. The Si oxide is contained for adjusting the O content and the like and may be $SiO_x (0<X≤2)$ such as SiO and $SiO_2$. Lithium silicate is represented by the general formula $xLi_2O \cdot ySiO_2$, and are specifically, for example, $Li_2Si_2O_5$ (x=1, y=2), $Li_2SiO_3$ (x=1, y=1), $Li_4SiO_4$ (x=2, y=1), $Li_6Si_2O_7$ (x=3, y=2), or the like.

In the raw material containing Si, O, and Li, a material that produces lithium silicate by heating can be also used instead of lithium silicate. Specific examples of the raw material include a material including one or both of LiOH and $Li_2CO_3$ and a Si simple substance. This material is heated and calcined as a primary raw material. When LiOH or $Li_2CO_3$ is heated and calcined in the coexistence of a Si simple substance, lithium silicate is generated while undesired elements are removed as gas components. Thus, a Si-lithium silicate-containing raw material including the Si simple substance and the lithium silicate is obtained. When this Si-lithium silicate-containing raw material as a secondary raw material is heated, a SiO gas and a Li gas are generated simultaneously. Similar to the secondary raw material (i.e., the Si-lithium silicate-containing raw material), the primary raw material can also include a Si oxide ($SiO_x$; $0<X\leq2$) for adjusting the O content and the like.

A reaction for forming lithium silicate herein can be performed immediately before a reaction for simultaneously generating a SiO gas and a Li gas. In other words, the primary raw material is heated and calcined to form the secondary raw material in the same reaction vessel, and then continuously the secondary raw material can be heated. Furthermore, the primary raw material can be heated and calcined in advance to form the secondary raw material. When the primary raw material is heated and calcined under reduced pressure, impurity elements can be separated more easily. When the primary raw material is heated and calcined in advance, heating and calcining is desirably performed in an atmosphere of an inert gas or under reduced pressure.

It is necessary that the average composition of the raw material containing Si, O, and Li can be represented by $SiLi_xO_y$, wherein $0.05<x<y$ and $0.5<y<1.5$ are satisfied. When x is too small, the addition effects of Li cannot sufficiently be obtained. On the other hand, when x is greater than or equal to y, a LiSi alloy is generated, and the reactivity of particles is increased. When y is too small, expansion and contraction during charge and discharge becomes large, and life property is deteriorated. When y is too large, inactive oxide is increased and the charge and discharge capacity of a powder is decreased. For these reasons, $0.05<x<y$ and $0.5<y<1.5$ are selected. In particular, it is desirable that x satisfy $0.05<x<0.7$, and y satisfy $0.9<y<1.1$. Each elemental ratio can be measured by the ICP emission spectroscopy and the infrared absorption method.

A material (deposit) collected after cooling on the same surface is pulverized and adjusted so as to have a predetermined particle size to obtain a powder for a negative electrode material (negative electrode active material). A temperature at cooling and collecting time is desirably 900° C. or less, and further preferably 800° C. or less. When the cooling temperature is 900° C. or more, a Si crystal particle is grown into a large size, and the life property is deteriorated. When the temperature is 600° C. or more, Li-containing silicon oxide having no Si crystal peak in XRD is obtained. When the later C-coating reaction is also executed at 700° C. or less, a C-coating Li-containing silicon oxide powder having no Si crystal peak and having good life property is obtained.

The method for pulverizing the material (deposit) collected after cooling on the same surface is not particularly limited, but in the method, it is preferable to take measures to prevent contamination of metal impurities. Specifically, a non-metal material such as ceramic is desirably used for a portion to be in contact with a powder body.

For the powder for negative electrode material, as a second stage, a part or entire of the surface of particles of the powder is covered with a conductive carbon coating membrane. In other words, C-coating is executed. Covering of the conductive carbon coating membrane, that is, formation of C-coating membrane allows reduction of electric resistance of a surface of particles and improvement of the battery property. The C-coating membrane herein is obtained by, for example, thermal CVD reaction using a hydrocarbon gas, but the method is not particularly limited.

A treatment temperature and an average film thickness are important in formation of the C-coating membrane, that is, C-coating treatment. The treatment temperature is 900° C. or less, and the average film thickness is 0.5 to 10 nm. Thus, although C-coating is executed to the Li-containing silicon oxide powder, a negative electrode material powder in which generation of SiC on the interface beneath the C-coating film is suppressed can be obtained.

When the treatment temperature is more than 900° C., a reaction for forming SiC proceeds quickly, and SiC is generated. When the C-coating reaction is performed at 800 to 900° C., heat treatment time is desirably three hours or less. When the heat treatment time is more than three hours, the reaction for forming SiC is accelerated, so that SiC may be generated.

Furthermore, when the C-coating reaction is executed at 700° C. or less, crystallization of Si can be suppressed. In this case, use of a material not having a crystal peak of Si in Li-containing silicon oxide powder before C-coating permits obtaining a material having no crystal peak of Si also after the C-coating. When the crystallization of Si proceeds, local expansion and contraction associated with charge and discharge occurs, which may be a factor of deteriorating life property such as crack of particles. The Si crystallization temperature may be changed depending on the Li content. However, Si crystallization can be suppressed by further reducing the reaction temperature as the increase in the Li content.

The lower limit of the treatment temperature is not particularly limited. However, since a low temperature makes the reaction speed slow, treatment at high temperature to some extent, such as 600° C., is desirable. Actually, for example, in a case of C-coating using thermal CVD, the treatment temperature is desirably 600° C. or more.

When the average film thickness is more than 10 nm, and when the treatment time or the amount of carbon is increased, a reaction for forming SiC is accelerated, and SiC is generated When the average film thickness is less than 0.5 nm, electric conductivity is not sufficient, and improvement of performance cannot be expected. The average film thickness of the C-coating film can be obtained by C weight per 1 g of powder/C density/BET equation specific surface area using the C content measured by the infrared absorption method, and BET equation specific surface area.

The average particle diameter of particles of the powder is desirably 1 to 20 µm. A large particle diameter causes increase of stress on particles by charge and discharge, and cracking, and causes a problem also in preparing an electrode. When a particle diameter is small, the specific surface area becomes large and the battery performance is deteriorated.

The above-described method for producing a silicon oxide powder according to the present invention produces a silicon oxide powder containing Li, and in which a distribution of Li concentration is uniform both inside particles and between particles although C-coating treatment is performed, and yet generation of SiC accompanying the C-coating treatment is suppressed. In other words, the method permits production of the negative electrode material of the present invention.

In the negative electrode material according to the present invention, as an index of uniformity of the distribution of a Li concentration in a silicon oxide powder, a ratio (L1/L2) wherein L1 is a Li concentration in a position at a depth of 50 nm from the outermost surface and L2 is a Li concentration in a position at a depth of 400 nm from the outermost surface in ten particles each having a minor axis of 1 μm or more, and a coefficient of variation of L2 among ten particles, are used. The coefficient of variation of L2 among ten particles is an index showing uniformity of the distribution of a Li concentration among ten particles, and is a value obtained by dividing the standard deviation of L2 among ten particles by an average value of L2 of the particles. The standard deviation of L2 is also an index showing uniformity of the distribution of a Li concentration, but the standard deviation is increased and decreased depending on the average values of L2 while an effect of the average value of L2 is removed, so that the coefficient of variation is more reasonable index of uniformity as compared with the standard deviation.

The Li concentration L1 in a position at the depth of 50 nm from the outermost surface of each particle means the Li concentration of the surface of particles, and the Li concentration L2 in a position at the depth of 400 nm from the outermost surface means the Li concentration inside particles. In all of ten particles each having a minor axis of 1 μm or more, satisfying $0.8<L1/L2<1.2$ means that the Li concentration is uniform from the surface to the inside of particles, that is, nonuniformity of the distribution of a Li concentration in particles is eliminated. Furthermore, the fact that the coefficient of variation of L2 of ten particles is 0.25 or less means that the nonuniformity of the distribution of a Li concentration among ten particles is eliminated. Note here that when the minor axis of the subjected particle is less than 1 μm, the Li concentration L2 may not represent the Li concentration inside particles.

If at least one of the ten particles each having a minor axis of 1 μm or more does not satisfy $0.8<L1/L2<1.2$, a Li-rich phase appears due to nonuniformity of the distribution of a Li concentration in particles, and there is a concern that powder with low reactivity and high battery performance may not be obtained. This L1/L2 is more preferably $0.85<L1/L2<1.15$. Furthermore, when the coefficient of variation of L2 is more than 0.25, a Li-rich phase appears in particles due to nonuniformity of the distribution of a Li concentration among particles, and powder with low reactivity and high battery performance may not be obtained. A particularly desirable coefficient of variation is 0.20 or less. The lower limit is not specified because the smaller the coefficient of variation is, the better.

The Li concentrations L1 and L2 can be relatively determined from a ratio of a Li spectral intensity to a Si spectral intensity, which is obtained by performing the cross-sectional TEM observation with respect to a particle of the powder, and then performing EELS measurements at positions at respective predetermined depths for a region of, for example, 20 nm in the longitudinal direction and 400 nm in the transverse direction.

When x is too small in the average composition $SiLi_xO_y$, of a powder, the addition effects of Li cannot be sufficiently obtained. When x is greater than or equal to y, a LiSi alloy is generated, resulting in increasing the reactivity of the powder. When y is too large, the charge and discharge capacity of the powder is decreased. For these reasons, $0.05<x<y$ and $0.5<y<1.5$ are selected. Each elemental ratio can be measured by the ICP emission spectroscopy and the infrared absorption method.

The average particle diameter of particles of the powder is 1 μm or more. The reason therefor is because a Li concentration L2 inside particles is defined as a Li concentration at a position at a depth of 400 nm from the outermost surface, and therefore if the average particle diameter is less than 1 μm, L2 may not be able to represent a Li concentration inside the particles, and reliability of L1/L2 may be reduced. The upper limit of the average particle diameter is not particularly limited, but it is desirably 20 μm or less because a larger average particle diameter makes an application process of an electrode difficult, and further tends to cause a crack and deterioration of performance due to expansion and contraction during charge and discharge.

In the negative electrode material according to the present invention, furthermore, it is necessary that an average film thickness of the C-coating film is 0.5 to 10 nm and that a SiC peak is not present in XRD measurement. When the average film thickness is less than 0.5 nm, the electric conductivity is not sufficient, and improvement of the performance cannot be expected. When the average film thickness is more than 10 nm, the treatment time and the carbon amount are increased to accelerate the reaction for forming SiC, and thus SiC is generated. When a SiC peak is not present in XRD measurement, since SiC unlike C does not have electric conductivity, SiC prevents desorption and insertion of electrons and Li, and may cause deterioration of the battery characteristics, particularly, the cycle durability and the discharge capacity.

Advantageous Effects of Invention

The method for producing a silicon oxide powder according to the present invention eliminates both a nonuniform distribution of a Li concentration inside particles and a nonuniform distribution of a Li concentration between particles and restricts treatment conditions in C-coating treatment for the powder, thereby not only effectively avoiding reduction of battery performance due to nonuniform distribution of a Li concentration but also suppressing generation of SiC, which is a problem in the C-coating treatment although the C-coating treatment is executed with respect to a Li-containing silicon oxide powder. Therefore, the method can improve battery performance multilaterally and effectively from many fields.

Furthermore, with a negative electrode material according to the present invention, a nonuniform distribution of a Li concentration inside particles and a nonuniform distribution of a Li concentration between particles as a silicon oxide powder for a negative electrode material powder are eliminated, and thereby not only the reduction of battery performance due to the nonuniform distribution of a Li concentration is effectively avoided but also generation of SiC can be suppressed. Therefore, the battery performance can be improved multilaterally from many fields and effectively.

DESCRIPTION OF EMBODIMENTS

Figure 1:
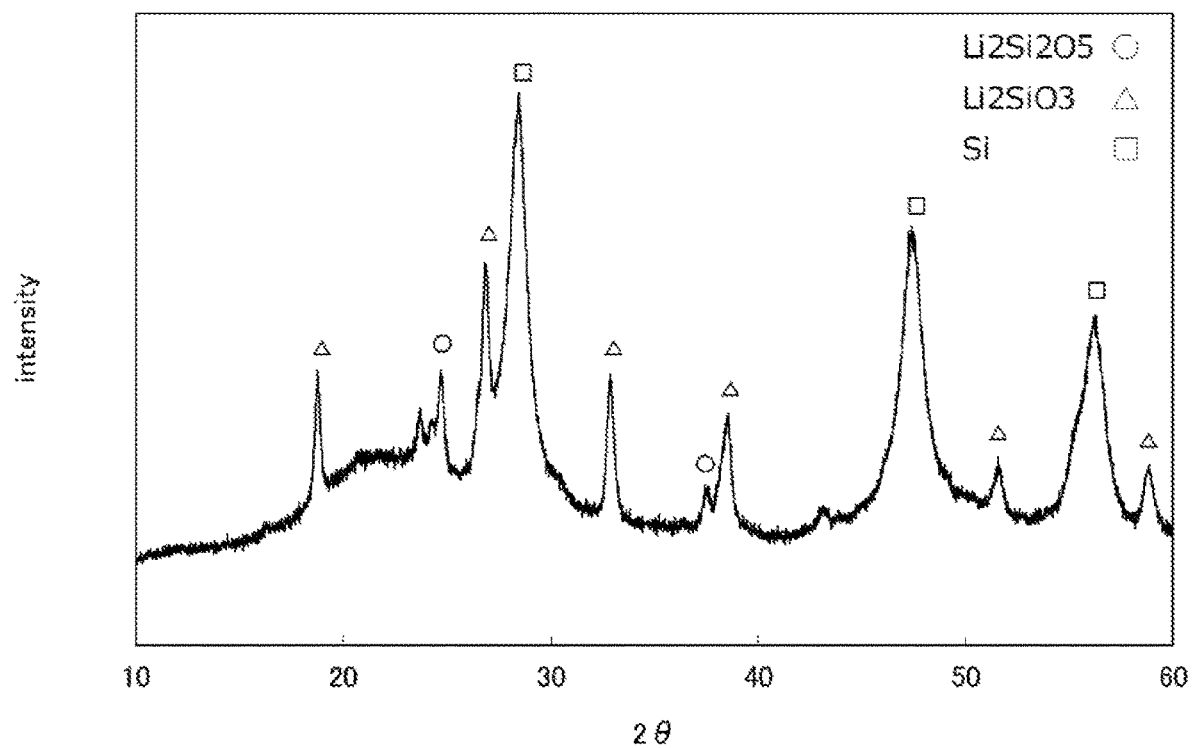
FIG. 1 is an XRD profile diagram of a C-coating Li-containing silicon oxide powder in accordance with an Example of the present invention.

Hereinafter, the embodiments of the present invention will be described. A typical method for producing a negative electrode material according to the present invention, that is, a typical method for producing a silicon oxide powder according to the present invention will be described below.

Firstly, a Si powder and a lithium-silicate powder, for example, a Li$_2$Si$_2$O$_5$ powder, as raw materials containing Si, O, and Li, are mixed with each other. A SiO$_2$ powder is mixed to adjust the O content if necessary. The mixing ratio of the powders is adjusted so that the average composition SiLi$_x$O$_y$ of the powder mixture satisfies 0.05<x<y and 0.5<y<1.5, and the element ratio of Li, Si, and O (Li:Si:O) becomes a target value (for example, 1:0.4:1).

Next, the above powder mixture as the raw material are placed in a reaction vessel, and heated under reduced pressure to generate a gas from, in particular, lithium silicate in the mixed raw material. In the gas-generating reaction herein, a SiO gas and a Li gas are generated simultaneously. With reference to chemical formulae, the general formula is estimated to be the formula (1). When lithium silicate is Li$_2$Si$_2$O$_5$, the formula is estimated to be the formula (2). As described above, lithium silicate is represented by the general formula xLi$_2$O.ySiO$_2$.

[Chem. 1]

$$(x+y)Si+(xLi_2O.ySiO_2) \rightarrow (x+2y)SiO\uparrow +2xLi\uparrow \qquad (1)$$

$$3Si+Li_2Si_2O_5 \rightarrow 5SiO\uparrow +2Li\uparrow \qquad (2)$$

As shown in the formulae (1) and (2), a SiO gas and a Li gas are generated simultaneously from lithium silicate by heating in the coexistence of a Si simple substance. The reaction herein is thought to be a reductive reaction by Si.

While gases are generated from the raw material in the reaction vessel, the generated gases are deposited by cooling on a surface of a vapor deposition table disposed in an upper portion in the reaction vessel. After the end of the reaction, a deposit is collected from the surface of the vapor deposition table. The collected deposit is a Li-containing silicon oxide material, and this material is pulverized and the particle size is adjusted, following C-coating treatment. Thus, a powder for a negative electrode material is obtained.

Since a SiO gas and a Li gas are simultaneously generated from the raw material in the reaction vessel, the concentration distribution of a gas mixture of the both gases is uniform. Accordingly, a deposit obtained by cooling the gas mixture on the same surface of a vapor deposition table will also have a uniform concentration distribution. Therefore, a powder obtained by pulverizing the deposit will have a uniform distribution of a Li concentration both between particles of the powder and in individual particles of the powder. When the powder is used as a powder for a negative electrode material, generation of a Li-rich phase is suppressed, and thereby, the reactivity is reduced and battery performance is improved.

A cooling temperature, that is, a deposition temperature of the simultaneously generated gases is desirably 900° C. or less from the viewpoint of suppressing growth of Si crystal particles. When the cooling temperature is 700° C. or less, Li-containing silicon oxide in which a Si crystal peak is not present in XRD is obtained.

The C-coating treatment is performed by a thermal CVD method using a hydrocarbon gas as a carbon source, for example, by heat treatment in an atmosphere of a gas mixture of argon and propane. The C-coating treatment herein is performed at 900° C. or less, and preferably at 800° C. or less. A heating atmosphere, a heating temperature, a heating time, and the like, are managed such that an average film thickness is 0.5 to 10 nm. This average film thickness corresponds to treatment time of three hours or less in a case where the treatment temperature is 900 to 800° C.

Such C-coating treatment improves the electrical conductivity between powder particles constituting a negative electrode, and the electrical conductivity between the negative electrode and its base, i.e., a current collector, resulting in enabling the battery properties, in particular, cycle properties, to be improved. In addition, since the Li-containing silicon oxide powder subjected to the C-coating is prevented from locally increasing the reactivity due to the uniformity of the distribution of a Li concentration, the heating temperature in the C-coating treatment is restricted to be low, and the average film thickness is also restricted to be small, the reaction for forming SiC on the surface of particles is suppressed in the C-coating treatment, and generation of SiC is prevented. In addition, when the treatment temperature in the C-coating treatment is restricted to 700° C. or less, generation of Si crystal is also suppressed.

In another embodiment, a Si powder is mixed with a LiOH powder. A SiO$_2$ powder is mixed to adjust the O content if necessary. The resulting powder mixture as a primary raw material is placed in a reaction vessel, and heated and calcined in an atmosphere of Ar. A reaction when LiOH is heated in the coexistence of a Si simple substance is estimated to be represented by the former part of the formula (3).

[Chem. 2]

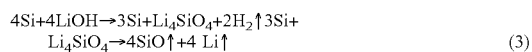

$$4Si+4LiOH \rightarrow 3Si+Li_4SiO_4+2H_2\uparrow 3Si+Li_4SiO_4 \rightarrow 4SiO\uparrow +4Li\uparrow \qquad (3)$$

$$4Si+2Li_2CO_3 \rightarrow 3Si+Li_4SiO_4+2CO\uparrow 3Si+Li_4SiO_4 \rightarrow 4SiO\uparrow +4Li\uparrow \qquad (4)$$

As shown in the former part of the formula (3), by heating and calcining LiOH in the coexistence of a Si simple substance, lithium silicate (Li$_4$SiO$_4$) is generated while an undesired element H is removed as a gas component. As a result, the calcined material is a mixture of lithium silicate (Li$_4$SiO$_4$) and a residual Si simple substance. This corresponds to the raw material containing Si, O, and Li used in the aforementioned embodiment.

Then, the resulting calcined material as a secondary raw material is continued to be heated under reduced pressure. Then, as shown in the latter part of the formula (3), in the secondary raw material, by heating lithium silicate (Li$_4$SiO$_4$) in the coexistence of a Si simple substance, a Si gas and a Li gas are generated simultaneously from the lithium silicate (Li$_4$SiO$_4$). The generated gases herein are cooled and collected on the same surface to obtain a powder for a negative electrode material having a uniform distribution of a Li concentration as in the aforementioned embodiment. Instead of continuously heating the secondary raw material, the secondary raw material may be newly heated again.

Thus, a raw material including a Si simple substance and lithium silicate (a Si-lithium silicate-containing raw material) can be obtained by heating and calcining a primary raw material including a Si simple substance and LiOH. By heating the resulting raw material as a secondary raw material, a SiO gas and a Li gas can be simultaneously obtained.

Instead of LiOH, LiCO$_3$ can also be used. In other words, a Si powder is mixed with a Li$_2$SiO$_3$ powder. A SiO$_2$ powder is mixed to adjust the O content, if necessary. The resulting powder mixture as a primary raw material is placed in a reaction vessel and heated and calcined in an atmosphere of Ar. A reaction in which Li$_2$CO$_3$ is heated in the coexistence of a Si simple substance is estimated to be represented by the former part of the formula (4).

As shown in the former part of the formula (4), by heating and calcining $Li_2CO_3$ in the coexistence of a Si simple substance, lithium silicate ($Li_4SiO_4$) is generated while an undesired element C is removed as a gas component. As a result, the calcined material is a mixture of lithium silicate ($Li_4SiO_4$) and a residual Si simple substance. This corresponds to the raw material containing Si, O, and Li used in the aforementioned embodiment.

Then, the resulting calcined material as a secondary raw material is continued to be heated under reduced pressure. As shown in the latter part of the formula (4), in the secondary raw material, when lithium silicate ($Li_4SiO_4$) is heated in the coexistence of a Si simple substance, a Si gas and a Li gas are simultaneously generated from the lithium silicate ($Li_4SiO_4$). When the generated gases herein are cooled and collected on the same surface, a Li-containing silicone oxide powder having a uniform distribution of a Li concentration can be obtained as in the aforementioned embodiment. Instead of continuously heating the secondary raw material, the secondary raw material may be newly heated again.

As described above, a raw material including a Si simple substance and lithium silicate (a Si-lithium silicate-containing raw material) can be obtained also by heating and calcining a primary raw material including a Si simple substance and $Li_2CO_3$. By heating the resulting raw material as a secondary raw material, a SiO gas and a Li gas can be generated simultaneously. LiOH and $Li_2CO_3$ can also be used instead of using LiOH or $Li_2CO_3$.

The resulting Li-containing silicon oxide powder is subjected to the C-coating treatment is the same as in the first embodiment.

Note here that the chemical reactions in the embodiments are represented by the chemical formulae (1) to (4), but these merely represent putative reactions in model cases in which these phenomena are simplified. The actual reactions may likely be more complicated due to addition of $SiO_2$ and the like for adjusting the O content.

EXAMPLES

Example 1

A Si powder and a $Li_2Si_2O_5$ powder were mixed in a molar ratio of 3:1. The element ratio of the powder mixture is Si:Li:O=1:0.4:1. This powder mixture as a raw material was placed in a reaction vessel and heated to 1400° C. under reduced pressure of 1 Pa. Generated gases were deposited and collected on a substrate, which had been cooled to 600° C., disposed in the upper portion of the reaction vessel. When the composition of the collected deposit was analyzed by the ICP emission spectroscopy and the infrared absorption method, the deposit was Li-containing silicon oxide having an average composition represented by $SiLi_xO_y$, (x=0.38, y=1.06).

The collected Li-containing silicon oxide deposit was pulverized into a powder in an agate mortar. Then, the powder was subjected to heat treatment as C-coating treatment in a rotary heating furnace at 850° C. for two hours while propane gas was introduced. When the average particle diameter of a Li-containing SiO powder after the C-coating was examined by the laser diffraction type particle size distribution measurement, $D_{50}$ was 5.4 μm. Furthermore, a surface area measured using a BET specific surface area measuring device was 2.4 $m^2$/g, the C content measured by the infrared absorption method was 4.8 wt %, and the average film thickness of the C-coating measured therefrom was 9.1 nm.

The resulting C-coating Li-containing SiO powder particles were subjected to the cross-sectional TEM observation, and ten particles each having a minor axis of 1 μm or more were extracted. Then, EELS measurement was performed in a region of 20 nm in the longitudinal direction and 400 nm in the transverse direction in a position at a depth of 50 nm from an outmost surface of each of the particles to obtain a Si spectral intensity and a Li spectral intensity. The ratio of the Li spectral intensity to the Si spectral intensity was defined as a Li concentration L1 on the surface of particles. The ratio of a Li spectral intensity to a Si spectral intensity was obtained also in a position at a depth of 400 nm from the outmost surface of the particles by the similar procedure. This was defined as a Li concentration L2 inside the particles. For each of the ten particles, L1/L2 was determined, and the standard deviation and a coefficient of variation of L2 were determined.

Furthermore, the resulting C-coating Li-containing SiO powder particles were subjected to XRD measurement by an X-ray diffraction device using a CuKα ray in diffraction angle interval of 0.2°. The XRD profile is shown in FIG. 1. Clear peaks of Si, $Li_2Si_2O_5$, and $Li_2SiO_3$ were observed, but a peak of SiC was not present.

Example 2

The deposit obtained in Example 1 was pulverized into a powder, and then the powder was subjected to heat treatment as C-coating treatment in a rotary heating furnace at 700° C. for 12 hours while propane gas was introduced. When the average particle diameter of the powder after the C-coating was examined by the laser diffraction type particle size distribution measurement, $D_{50}$ was 5.3 μm. Furthermore, a surface area measured by a BET specific surface area measuring device was 2.5 $m^2$/g, the C content measured by the infrared absorption method was 2.6 wt %, and the average film thickness of the C-coating measured therefrom was 4.7 nm.

Furthermore, the resulting C-coating Li-containing SiO powder particles were subjected to the cross-sectional TEM observation, and ten particles each having a minor axis of 1 μm or more were extracted. Then, each of the particles was subjected to the cross-sectional TEM observation and the EELS measurement in the same manner as Example 1 to obtain L1/L2, and standard deviation and a coefficient of variation of L2.

Figure 2:
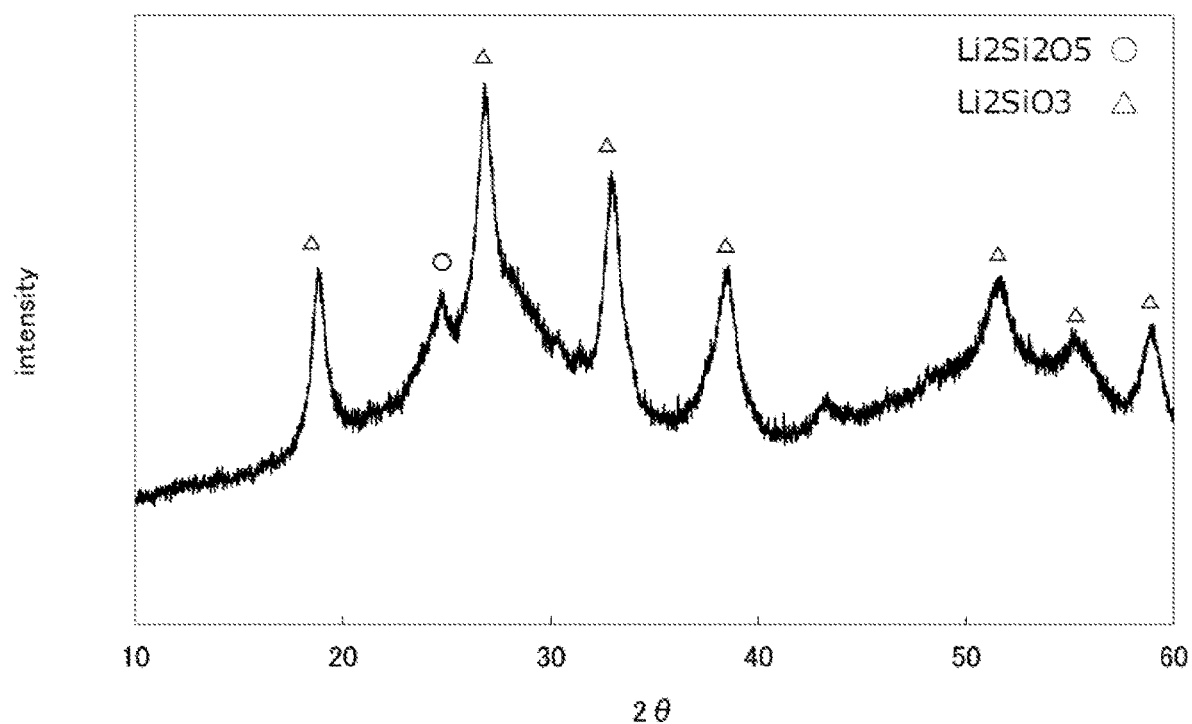
FIG. 2 is an XRD profile diagram of a C-coating Li-containing silicon oxide powder in accordance with another Example of the present invention.

In addition, the resulting C-coating Li-containing SiO powder particle was subjected to XRD measurement in the same manner as Example 1. The XRD profile is shown in FIG. 2. Clear peaks of $Li_2Si_2O_5$ and $Li_2SiO_3$ were observed, but peaks of SiC and Si were not present.

Example 3

A Si powder, a $SiO_2$ powder, and a $Li_2Si_2O_5$ powder were mixed in a molar ratio of 11:5:2. The element ratio of the powder mixture is Si:Li:O=1:0.2:1. This powder mixture as a raw material was placed in a reaction vessel and heated to 1400° C. under reduced pressure of 1 Pa. Generated gases were deposited and collected on a substrate, which had been cooled to 600° C., disposed in the upper portion of the reaction vessel. When the composition of the collected deposit was analyzed by the ICP emission spectroscopy and the infrared absorption method, the deposit was Li-containing silicon oxide having an average composition of $SiLi_xO_y$, (x=0.18, y=1.02).

The collected Li-containing silicon oxide deposit was pulverized into a powder in an agate mortar. Then, the powder was subjected to heat treatment as C-coating treatment in a rotary heating furnace at 850° C. for two hours while propane gas was introduced. When the average particle diameter of a Li-containing silicon oxide powder after the C-coating was examined by the laser diffraction type particle size distribution measurement, $D_{50}$ was 5.4 μm. Furthermore, a surface area measured using a BET specific surface area measuring device was 2.2 m²/g, the C content measured by the infrared absorption method was 4.4 wt %, and the average film thickness of the C-coating measured therefrom was 9.1 nm.

The resulting C-coating Li-containing SiO powder particles were subjected to the cross-sectional TEM observation, and ten particles each having a minor axis of 1 μm or more were extracted. Then, EELS measurement was performed in a region of 20 nm in the longitudinal direction and 400 nm in the transverse direction in a position at a depth of 50 nm from an outmost surface of each of the particles to obtain a Si spectral intensity and a Li spectral intensity. The ratio of the Li spectral intensity to the Si spectral intensity was defined as a Li concentration L1 on the surface of particles. The ratio of a Li spectral intensity to a Si spectral intensity was obtained also in a position at a depth of 400 nm from the outmost surface of the particles by the similar procedure. This was defined as a Li concentration L2 inside the particles. For each of the ten particles, L1/L2 was determined, and the standard deviation and a coefficient of variation of L2 were determined.

In addition, the resulting C-coating Li-containing SiO powder particles were subjected to XRD measurement by an X-ray diffraction device using a CuKα ray in diffraction angle interval of 0.2°. Clear peaks of Si and $Li_2Si_2O_5$ were observed, but a peak of SiC was not present.

Example 4

A Si powder and a $Li_2Si_2O_5$ powder were mixed in a molar ratio of 2:1. The element ratio of the powder mixture is Si:Li:O=1:0.67:1. This powder mixture as a raw material was placed in a reaction vessel, and heated to 1400° C. under reduced pressure of 1 Pa. Generated gases were deposited and collected on a substrate, which had been cooled to 600° C., disposed in the upper portion of the reaction vessel. When the composition of the collected deposit was analyzed by the ICP emission spectroscopy and the infrared absorption method, the deposit was Li-containing silicon oxide having an average composition of $SiLi_xO_y$ (x=0.95, y=1.05).

The collected Li-containing silicon oxide deposit was pulverized into a powder in an agate mortar. Then, the resulting powder was subjected to heat treatment as C-coating treatment in a rotary heating furnace at 850° C. for two hours while propane gas was introduced. When the average particle diameter of a Li-containing silicon oxide powder after the C-coating was examined by the laser diffraction type particle size distribution measurement, $D_{50}$ was 5.1 μm. Furthermore, a surface area measured using a BET specific surface area measuring device was 2.1 m²/g, the C content measured by the infrared absorption method was 4.5 wt %, and the average film thickness of the C-coating measured therefrom was 9.7 nm.

Particles of the resulting C-coating Li-containing SiO powder were subjected to the cross-sectional TEM observation, and ten particles each having a minor axis of 1 μm or more were extracted. Then, EELS measurement was performed in a region of 20 nm in the longitudinal direction and 400 nm in the transverse direction in a position at a depth of 50 nm from an outmost surface of each of the particles to obtain a Si spectral intensity and a Li spectral intensity. The ratio of the Li spectral intensity to the Si spectral intensity was defined as a Li concentration L1 on the surface of particles. The ratio of a Li spectral intensity to a Si spectral intensity was obtained also in a position at a depth of 400 nm from the outmost surface of the particles by the similar procedure. This was defined as a Li concentration L2 inside the particles. For each of the ten particles, L1/L2 was determined, and the standard deviation and a coefficient of variation of L2 were determined.

In addition, the resulting C-coating Li-containing SiO powder particles were subjected to XRD measurement by an X-ray diffraction device using a CuKα ray in diffraction angle interval of 0.2°. Clear peaks of Si, $Li_2SiO_3$, and $Li_4SiO_4$ were observed, but a peak of SiC was not present.

Comparative Example 1

A Si powder and a $SiO_2$ powder were mixed in a molar ratio of 1:1. This powder mixture was placed in a reaction vessel and heated to 1400° C. under reduced pressure of 1 Pa. Generated gases were deposited and collected on a substrate, which had been cooled to 600° C., disposed in the upper portion of the reaction vessel. The collected SiO deposit was pulverized in an agate mortar to obtain a SiO powder.

In order to perform Li-doping to the SiO powder by the solid phase method, the SiO powder and a LiH powder were mixed in a molar ratio of 5:2, and the resulting powder mixture was heated to 600° C. in an atmosphere of Ar. When the composition of the resulting Li-containing SiO powder was analyzed by the ICP emission spectroscopy and the infrared absorption method, the composition was $SiLi_xO_y$ (x=0.42, y=0.96).

Next, this Li-containing SiO powder was subjected to heat treatment as C-coating treatment in a rotary heating furnace at 1000° C. for one hour while propane gas was introduced. When the average particle diameter of a Li-containing SiO powder after the C-coating was examined by the laser diffraction type particle size distribution measurement, $D_{50}$ was 5.7 μm. Furthermore, a surface area measured using a BET specific surface area measuring device was 2.2 m²/g, the C content measured by the infrared absorption method was 3.0 wt %, and the average film thickness of the C-coating measured therefrom was 6.2 nm.

Furthermore, the resulting C-coating Li-containing SiO powder particles were subjected to the cross-sectional TEM observation, and ten particles each having a minor axis of 1 μm or more were extracted. Then, each of the particles was subjected to the EELS measurement in the same manner as Example 1 to obtain L1/L2, and standard deviation and a coefficient of variation of L2.

Figure 3:
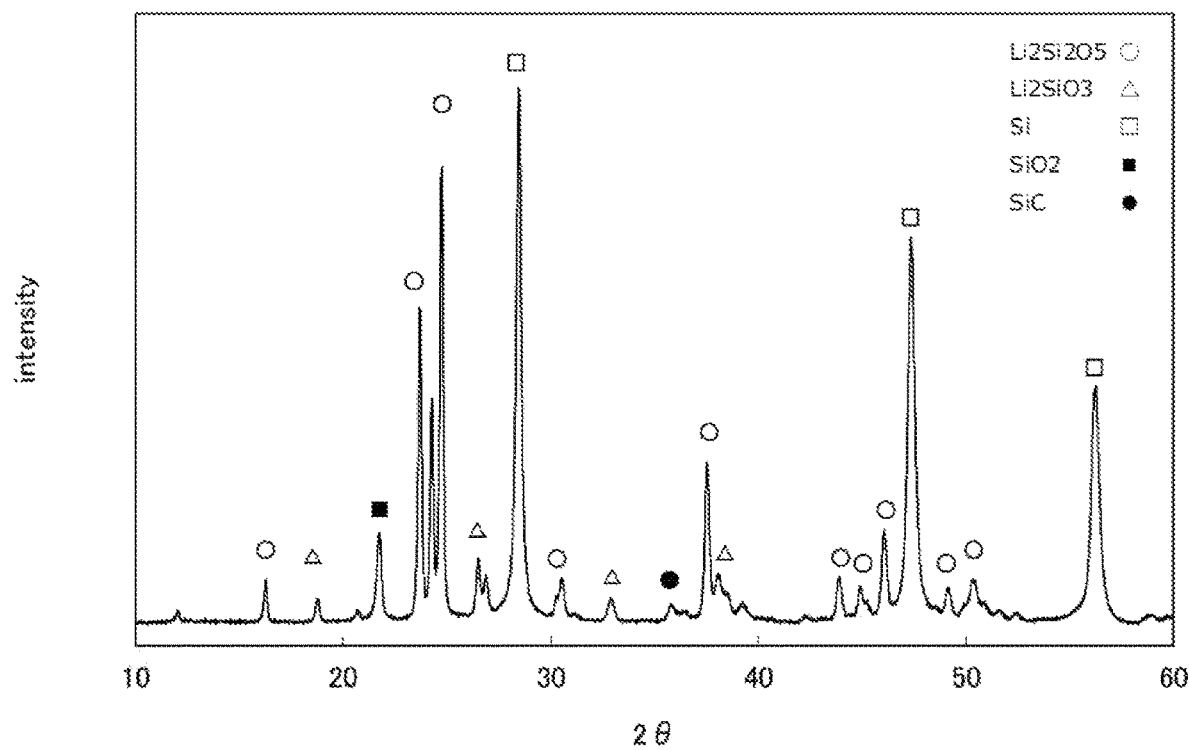
FIG. 3 is an XRD profile diagram of a C-coating Li-containing silicon oxide powder in accordance with Comparative Example of the present invention.

In addition, the resulting C-coating Li-containing SiO powder was subjected to XRD measurement in the same manner as Example 1. The XRD profile is shown in FIG. 3. A peak of SiC is observed. Besides, peaks of Si, $SiO_2$, $Li_2Si_2O_5$, and $Li_2SiO_3$ are present.

Comparative Example 2

A SiO powder was obtained from a Si powder and a $SiO_2$ powder in the same manner as in Comparative Example 1.

Then, the resulting SiO powder was subjected to heat treatment as C-coating treatment in a rotary heating furnace at 1000° C. for one hour while propane gas was introduced.

The SiO powder and a LiH powder were mixed in a molar ratio of 5:2 in order to perform Li-doping to the resulting C-coating SiO powder by the solid phase method, and the resulting powder mixture was heated in an atmosphere of Ar at 600° C. When the composition of the resulting C-coating Li-containing SiO powder was analyzed by the ICP emission spectroscopy and the infrared absorption method, the composition was $SiLi_xO_y$ (x=0.40, y=1.03).

When the average particle diameter of the Li-containing SiO powder after the C-coating was examined by the laser diffraction type particle size distribution measurement, $D_{50}$ was 5.9 μm. Furthermore, a surface area measured using a BET specific surface area measuring device was 2.4 m$^2$/g, the C content measured by the infrared absorption method was 3.2 wt %, and the average film thickness of the C-coating measured therefrom was 6.1 nm.

The resulting C-coating Li-containing SiO powder particles were subjected to the cross-sectional TEM observation, and ten particles each having a minor axis of 1 μm or more were extracted. Then, each of the particles was subjected to the EELS measurement in the same manner as Example 1 to obtain L1/L2, and standard deviation and a coefficient of variation of L2.

Furthermore, the resulting C-coating Li-containing SiO powder was subjected to XRD measurement in the same manner as Example 1. Peaks of Si, $Li_2Si_2O_5$, and $Li_2SiO_3$ were observed, but a peak of SiC was not present.

Comparative Example 3

A Li-containing silicon oxide powder obtained in Example 1 having an average composition represented by $SiLi_xO_y$ (x=0.38, y=1.06) was subjected to heat treatment as C-coating treatment in a rotary heating furnace at 850° C. for six hours while propane gas was introduced.

When the average particle diameter of the Li-containing silicon oxide powder after the C-coating was examined by the laser diffraction type particle size distribution measurement, $D_{50}$ was 5.7 μm. Furthermore, a surface area measured using a BET specific surface area measuring device was 2.7 m$^2$/g, the C content measured by the infrared absorption method was 15.1 wt %, and the average film thickness of the C-coating measured therefrom was 25.4 nm.

The resulting C-coating Li-containing SiO powder particles were subjected to the cross-sectional TEM observation, and ten particles each having a minor axis of 1 μm or more were extracted. Then, each particle was subjected to EELS measurement in the same manner as Example 1 to obtain L1/L2, and the standard deviation and the coefficient of variation of L2.

Furthermore, the resulting C-coating Li-containing silicon oxide powder was subjected to XRD measurement in the same manner as Example 1, clear peaks of SiC, Si, $Li_2Si_2O_5$, and $Li_2SiO_3$ were present.

Comparative Example 4

A Li-containing silicon oxide powder obtained in Example 1 and having an average composition represented by $SiLi_xO_y$ (x=0.38, y=1.06) was subjected to heat treatment as C-coating treatment in a rotary heating furnace at 850° C. for five minutes while propane gas was introduced.

When the average particle diameter of the Li-containing silicon oxide powder after the C-coating was examined by the laser diffraction type particle size distribution measurement, $D_{50}$ was 5.1 μm. Furthermore, a surface area measured using a BET specific surface area measuring device was 2.5 m$^2$/g, the C content measured by the infrared absorption method was 0.21 wt %, and the average film thickness of the C-coating measured therefrom was 0.38 nm.

The resulting C-coating Li-containing SiO powder particles were subjected to the cross-sectional TEM observation, and ten particles each having a minor axis of 1 μm or more were extracted. Then, each particle was subjected to EELS measurement in the same manner as Example 1 to obtain L1/L2, and the standard deviation and the coefficient of variation of L2.

Furthermore, the resulting C-coating Li-containing SiO powder was subjected to XRD measurement in the same manner as Example 1, clear peaks of Si, $Li_2Si_2O_5$, and $Li_2SiO_3$ were observed, but a peak of SiC was not present.

Battery Evaluation

Battery evaluation was performed with respect to the powder samples prepared in Examples 1 to 4 and Comparative Examples 1 to 4 according to the following procedure.

The powder sample, a PI binder as a nonaqueous (organic) binder, and a KB as an electrically conductive auxiliary agent were mixed in a weight ratio of 80:15:5 and kneaded with an organic solvent NMP to prepare a slurry. The prepared slurry was applied onto a copper foil and subjected to vacuum heat treatment at 350° C. for 30 minutes to obtain a negative electrode. This negative electrode, a counter electrode (a Li foil), an electrolytic solution (EC:DEC=1:1), an electrolyte (1 mol/L of $LiPF_6$), and a separator (a polyethylene porous film having a film thickness of 30 μm) were combined to prepare a coin cell battery.

The prepared coin cell battery was subjected to a charge and discharge test. Charge was performed at a constant current of 0.1 C until the voltage across the two electrodes of the battery reached 0.005 v. After the voltage reached 0.005 V, constant-potential charge was performed until the electric current reached 0.01 C. Discharge was performed at a constant current of 0.1 C until the voltage across the two electrodes of the battery reached 1.5 V.

The initial charge capacity and initial discharge capacity were measured by this charge and discharge test to determine the initial efficiency. Furthermore, the capacity maintenance rate after 50 cycles was examined Results are shown in Table 1 along with the main specifications (presence or absence of SiC peak, presence or absence of Si peak, L1/L2, and standard deviation and a coefficient of variation of L2, and the C-coating film thickness).

TABLE 1

|  | Composition | SiC peak | Si peak | L1/L2 | L2 SD | L2 CV | Thickness of C-coating (nm) | Initial charge capacity (mAh/g) | Initial discharge capacity (mAh/g) | Initial efficiency | Capacity maintenance rate |
|---|---|---|---|---|---|---|---|---|---|---|---|
| Example 1 | SiLi0.38 O1.06 | Not present | Present | 0.92-1.07 | 0.05 | 0.09 | 9.1 | 2080 | 1668 | 80.2% | 80.1% |
| Example 2 | SiLi0.38 O1.06 | Not present | Not present | 0.88-1.11 | 0.07 | 0.14 | 4.7 | 2106 | 1687 | 80.1% | 83.5% |
| Example 3 | SiLi0.18 O1.02 | Not present | Present | 0.93-1.07 | 0.04 | 0.20 | 9.1 | 2195 | 1699 | 77.4% | 83.9% |
| Example 4 | SiLi0.95 O1.05 | Not present | Present | 0.91-1.06 | 0.05 | 0.10 | 9.7 | 1932 | 1594 | 82.5% | 74.2% |
| Comparative Example 1 | SiLi0.42 O0.96 | Present | Present | 1.19-1.57 | 0.14 | 0.27 | 6.2 | 1788 | 1318 | 73.7% | 42.0% |
| Comparative Example 2 | SiLi0.40 O1.03 | Not present | Present | 1.21-1.58 | 0.15 | 0.30 | 6.1 | 1947 | 1538 | 78.7% | 70.8% |
| Comparative Example 3 | SiLi0.38 O1.06 | Present | Present | 0.89-1.11 | 0.05 | 0.11 | 25.4 | 1844 | 1435 | 77.8% | 69.7% |
| Comparative Example 4 | SiLi0.38 O1.06 | Not present | Present | 0.95-1.05 | 0.04 | 0.09 | 0.38 | 2096 | 1662 | 79.3% | 60.4% |

*1: SD = standard deviation
*2: CV = coefficient of variation

As can be seen from the results of Examples 1 to 4 and Comparative Examples 1 to 4, when a Si-containing silicon oxide powder having uniformly dispersing Li was subjected to thin film C-coating at a low temperature, a negative electrode material having high battery performance was obtained.

Incidentally, in Comparative Example 1, the C-coating was performed after the Li-doping by the solid phase method. Consequently, the distribution of a Li concentration is nonuniform. As a result, a SiC peak is present, so that the battery performance is largely inferior as compared with Examples 1 to 4.

In Comparative Example 2, after the C-coating, the Li-doping by the solid phase method was performed. A SiC peak is not present, but the distribution of a Li concentration is nonuniform, and therefore, battery performance is inferior as compared with Examples 1 to 4 although the battery performance is not as inferior as in that of Comparative Example 1.

In Comparative Example 3, the distribution of a Li concentration is uniform, but a film thickness of the C-coating was thick, and heating conditions are severe, so that a SiC peak is present, and battery performance is inferior as compared with Examples 1 to 4.

In Comparative Example 4, since the distribution of a Li concentration is uniform, a film thickness of the C-coating is thin, and heating condition is gentle, a SiC peak is not present. However, because the C-coating is too thin, the battery performance was inferior as compared with Examples 1 to 4.

The invention claimed is:

1. A method for producing a Li containing silicon oxide particle, the method comprising:
   heating a raw material comprising Si, Li, and O under reduced pressure to generate a SiO gas and a Li gas simultaneously;
   cooling the generated gases to prepare Li-containing silicon oxide particles having an average composition represented by SiLixOy wherein $0.05<x<y$ and $0.5<y<1.5$ are satisfied; and
   forming a C-coating film having an average film thickness of 0.5 to 10 nm on a surface of the particles at a treatment temperature of 900° C. or less after adjusting the particle size.

2. The method for producing a Li containing silicon oxide particle according to claim 1, wherein the raw material comprising Si, Li, and O is a Si-lithium silicate-containing raw material in which a portion of the Si is present as an a Si simple substance, and the Li is present as lithium silicate.

3. The method for producing a Li containing silicon oxide particle according to claim 1, wherein the treatment temperature is 700° C. or less.

4. The method for producing a Li containing silicon oxide particle according to claim 2, wherein the treatment temperature is 700° C. or less.

* * * * *